Figure 1:
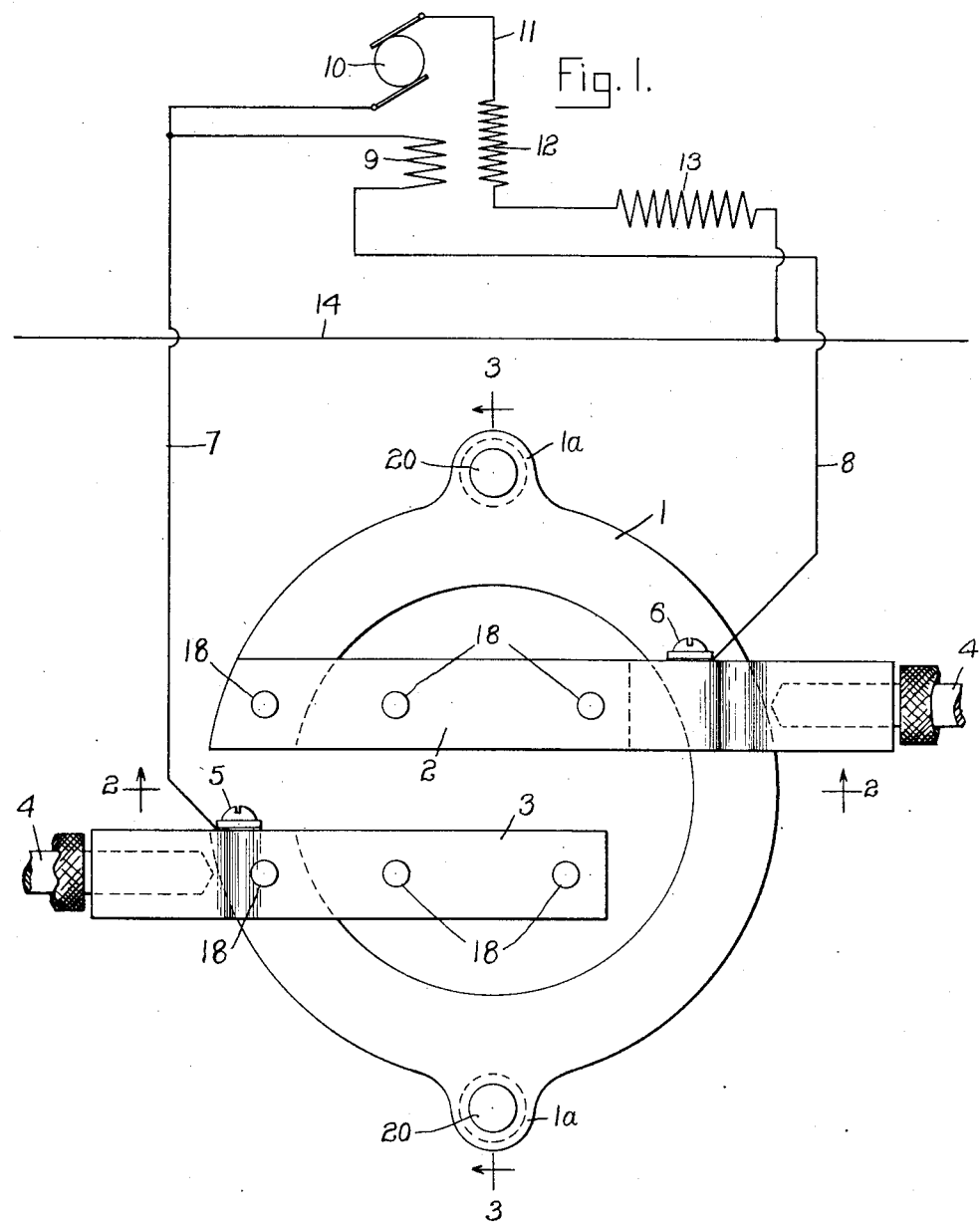

G. M. WILLIS.
SHUNT FOR MEASURING INSTRUMENTS.
APPLICATION FILED FEB. 17, 1911.

1,084,721.

Patented Jan. 20, 1914.

2 SHEETS—SHEET 1.

Witnesses
George C. Higham.
Leonard W. Novander

Inventor
George M. Willis
By Brown & Williams
Attorneys

G. M. WILLIS.
SHUNT FOR MEASURING INSTRUMENTS.
APPLICATION FILED FEB. 17, 1911.
1,084,721.
Patented Jan. 20, 1914.
2 SHEETS—SHEET 2.
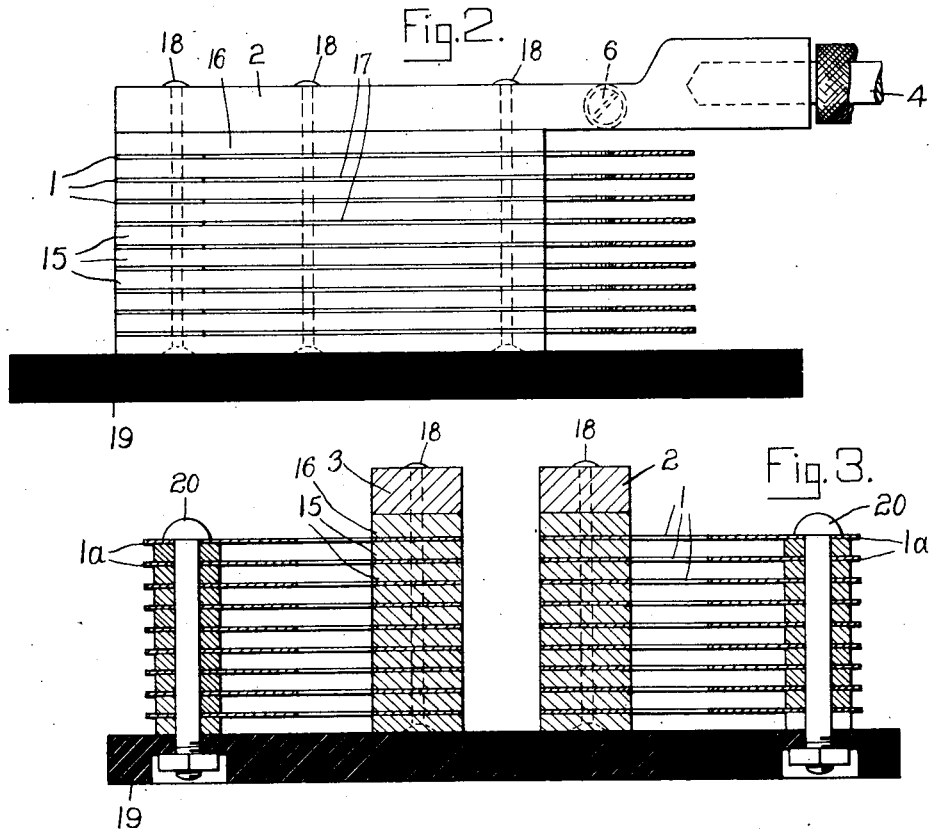
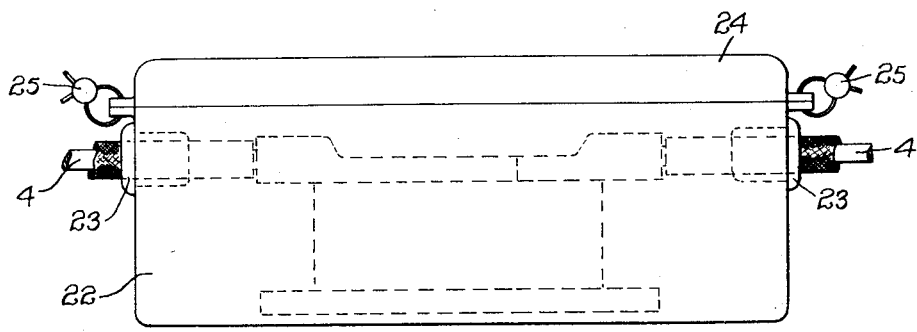
Witnesses
George C. Higham
Leonard W. Novander
Inventor
George M. Willis
By Brown & Williams
Attorneys

UNITED STATES PATENT OFFICE.

GEORGE M. WILLIS, OF CHICAGO, ILLINOIS, ASSIGNOR, BY MESNE ASSIGNMENTS, TO CHICAGO ELECTRIC METER COMPANY, OF CHICAGO, ILLINOIS, A CORPORATION OF ILLINOIS.

SHUNT FOR MEASURING INSTRUMENTS.

1,084,721. Specification of Letters Patent. Patented Jan. 20, 1914.

Application filed February 17, 1911. Serial No. 609,237.

*To all whom it may concern:*

Be it known that I, GEORGE M. WILLIS, a citizen of the United States, residing at Chicago, in the county of Cook and State of Illinois, have invented a certain new and Improved Shunt for Measuring Instruments, of which the following is a full, clear, concise, and exact description, reference being had to the accompanying drawings, forming a part of this specification.

My invention relates to an improved construction of electric shunt for use with measuring instruments, adapted for use either with direct or alternating currents without change in the shunt ratio.

As is well known in the art, electric measuring instruments adapted for use with shunts by which heavy currents may be flowing in line conductors while only a portion of such currents is diverted through the measuring instruments, have a certain amount of self-induction, as a result of which the shunts heretofore employed have necessarily been calibrated either for direct or alternating current and have not been applicable to measure such currents indifferently.

By my invention I construct the shunt adapted for use with any particular electrical instrument so that it possesses a certain amount of self-induction, the total amount of self-induction of the shunt for any given periodicity and current flow through the shunt being equal to the total self-induction produced at the same time in the meter winding in parallel with the shunt. In other words, the coefficients of self-induction of the shunt and the winding to be used in parallel with such shunt are so related as to be inversely proportional to the shunt ratio, as a result of which when the shunt and its associated instrument winding are used in an alternating current circuit the reactances resulting from the self-induction of the shunt and the associated winding increase or decrease together, always maintain a relation to each other equal to the relation between the ohmic resistance of the shunt and the associated winding, which relation is in the present application spoken of as the shunt ratio.

The relation above referred to is more clearly expressed by a consideration of the relations of resistance and reactance in both the shunt and its associated winding. Let the resistance of the shunt $=R$ and its coefficient of self-induction $=L$ and its impedance $=Z$. Let the resistance of the associated instrument winding $=r$ and its coefficient of self-induction $=L'$ and its impedance value $=Z'$. Now for a periodicity $=w$ we have the following relations:

$$Z = \sqrt{R^2 + (wL)^2}$$
$$Z' = \sqrt{r^2 + (wL')^2}$$

Assuming, now, that the shunt ratio is to be 10 to 1,—that is, for every ampere of current flowing in the instrument winding ten amperes are to flow in the shunt,—then we have—

$$r = 10R$$
$$L' = 10L$$
$$Z' = \sqrt{(10R)^2 + (w \times 10L)^2}$$
$$= \sqrt{100R^2 + 100(wL)^2}$$
$$= 10\sqrt{R^2 + (wL)^2}$$
$$= 10Z$$

From this it appears that the relation between the impedance values Z and Z' is constant for any periodicity when the coefficients of self-induction L and L' are inversely to each other as the shunt ratio. Since the impedance values Z and Z' always maintain to each other the shunt ratio, it follows that the shunt ratio is always constant for direct or alternating current and in the latter case regardless of the periodicity or amount of current flow.

My invention also consists in a novel construction of shunt by which the results above indicated are carried out.

The several drawings illustrating my invention are as follows:

Figure 1 is a plan view of my improved shunt, together with a diagrammatic showing of the connections of a measuring instrument that may be employed therewith. Fig. 2 is a sectional view of the shunt taken along the line 2—2 in Fig. 1. Fig. 3 is a sectional view of the shunt taken along the line 3—3 in Fig. 1. Fig. 4 is a view of a casing that may be employed to contain the shunt and protect it from accident or tampering.

Similar numerals refer to similar parts throughout the several views.

As shown in the drawings, my shunt consists essentially of a plurality of annular shaped members 1, open at one side, to the ends of which the heavy connectors 2 and 3 are secured. The connectors 2 and 3 are designed to receive the ends of one of the line wires 4, which wire is cut to insert the shunt in circuit therewith. The connectors 2 and 3 are provided with screws 5 and 6 for receiving the ends of the wires 7 and 8 extending to the winding 9 of the measuring instrument, which in the case shown in Fig. 1 is the series winding of an electric wattmeter. The pressure winding of the wattmeter is shown diagrammatically as the armature winding 10, one terminal of which is connected to the wire 7 while the other terminal is connected by the wire 11 with the starting coil 12 and through such starting coil to the resistance 13, the other terminal of which is connected with the other line wire 14.

As shown more clearly in Figs. 2 and 3, the shunt is composed of a plurality of thin annular disks 1 of suitable material, as German silver, which are separated by spacers 15, so that the amount of heat developed by such annular pieces may be a minimum. The connectors 2 and 3 have secured to them an upper spacing bar 16, below which alternate the thin strips 17 and the thicker strips 15, preferably of copper and secured together by the rivets 18. While rivets are here shown for the purpose of securing these bars in place, it is to be understood that screws or equivalent securing means may be employed, if desired. The thin pieces 17, which are preferably of copper, are of the same thickness as the annular members 1. In this way a good connection is made between each of the connectors 2 and 3 and the ends of all of the annular members 1, which insures that each member shall receive its proper proportion of the current flowing through the shunt. The shunt thus constructed is supported upon a suitable base 19 by means of bolts 20 extending through ears 1$^a$ formed on the annular members 1, suitable washers 21, of conducting material, as copper, being provided between the annular members 1 to keep them properly spaced. The circular form of the annular members 1 gives to the shunt an amount of self-induction which may readily be proportioned so that its coefficient of self-induction will bear a relation to the coefficient of self-induction of the winding to be used with such shunt inversely proportional to the ratio of the currents flowing through the shunt and such winding, the latter ratio being referred to in the present application as the shunt ratio.

The shunt constructed as indicated above may be contained within the casing of the instrument with which it is to be used, or, if preferred, it may be contained in its own case 22, as indicated in Fig. 4, suitable insulating bushings 23 being provided to receive the conductors passing through the wall of the casing to the shunt. The casing 22 may be provided with a cover 24 secured in place by suitable seals 25, if desired, so that access to the shunt is prevented except to a person properly authorized.

From the above it will at once appear that the shunt ratio is maintained constant for any variation in periodicity or current value in the line conductor in which the shunt is connected, and that when the apparatus is used in connection with direct current that the ohmic resistances of the shunt and associated instrument winding bear the same relation to each other as do the impedance values resulting from the ohmic resistances and reactances when alternating currents are used.

While I have shown my invention in the particular embodiment herein disclosed, I do not, however, limit myself to this construction, but desire to claim any equivalent that may suggest itself to those skilled in the art.

What I claim is:

1. A shunt for electrical instruments, comprising a plurality of thin flat elements of resistance metal formed in similar split rings and superposed upon each other but out of contact with each other, spacing members between the corresponding ends of the rings to maintain them in separated relation, and a connector rigidly secured to each end of the split annular structure thus produced, the shunt thus produced having a predetermined resistance and coefficient of self-induction.

2. A shunt for electrical instruments, comprising a plurality of thin flat elements of resistance metal formed in split rings together having a predetermined resistance and coefficient of self-induction, clamping devices for electrically connecting the corresponding ends of the rings together, and a conductor rigidly secured to each end of the annular structure thus formed.

3. A shunt for electrical instruments, comprising a thin flat element of resistance metal formed in a split ring having a predetermined resistance and coefficient of self-induction.

4. In a shunt for electric instruments, a resistance element formed in a split ring with its ends in proximity to each other and having a predetermined resistance and coefficient of self-induction, and a connector rigidly secured to each end of the ring.

In witness whereof, I hereunto subscribe my name this 10th day of February, A. D. 1911.

GEORGE M. WILLIS.

Witnesses:
 ALBERT C. BELL,
 J. M. STEWART.

Copies of this patent may be obtained for five cents each, by addressing the "Commissioner of Patents, Washington, D. C."